(12) United States Patent
Tamura et al.

(10) Patent No.: US 10,023,087 B2
(45) Date of Patent: Jul. 17, 2018

(54) VEHICLE SEAT

(71) Applicant: TOYOTA JIDOSHA KABUSHIKI KAISHA, Toyota-shi (JP)

(72) Inventors: Hiroshi Tamura, Toyota (JP); Akira Kaneko, Toyota (JP); Takuya Ishikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 89 days.

(21) Appl. No.: 14/912,977

(22) PCT Filed: Aug. 15, 2014

(86) PCT No.: PCT/JP2014/071943
§ 371 (c)(1),
(2) Date: Feb. 19, 2016

(87) PCT Pub. No.: WO2015/029885
PCT Pub. Date: Mar. 5, 2015

(65) Prior Publication Data
US 2016/0200232 A1 Jul. 14, 2016

(30) Foreign Application Priority Data

Aug. 28, 2013 (JP) .................. 2013-177251

(51) Int. Cl.
*B60N 2/68* (2006.01)
*B60N 2/42* (2006.01)
(Continued)

(52) U.S. Cl.
CPC .............. *B60N 2/686* (2013.01); *B60N 2/48* (2013.01); *B60N 2/68* (2013.01); *B60N 2/682* (2013.01);
(Continued)

(58) Field of Classification Search
None
See application file for complete search history.

(56) References Cited

U.S. PATENT DOCUMENTS 4,711,497 A * 12/1987 Kazaoka ................ B60N 2/686
297/452.54
5,988,757 A * 11/1999 Vishey ..................... B60N 2/23
297/452.18
(Continued)

FOREIGN PATENT DOCUMENTS

DE 7023464 9/1970
DE 3046427 A1 7/1982
(Continued)

OTHER PUBLICATIONS

International Search Report and Written Opinion dated Dec. 4, 2014 in PCT/JP2014/071943 filed Aug. 15, 2014.
(Continued)

*Primary Examiner* — Joshua J Michener
*Assistant Examiner* — Kyle J. Walraed-Sullivan
(74) *Attorney, Agent, or Firm* — Oblon, McClelland, Maier & Neustadt, L.L.P.

(57) ABSTRACT

A vehicle seat (10) comprising a seat cushion frame (72) that configures a seat cushion (70); a seat back frame (14) that configures a seat back (12), the seat back frame (14) being formed in a panel shape and having, on a lower portion thereof on both sides in a seat width direction, coupling portions (46) that are coupled to the seat cushion frame (72); fixing portions (20) that are formed in an upper portion of the seat back frame (14) and fix a headrest (60); and load transmitting portions (40) that are disposed in the seat back frame (14), are each formed in a substantially L-shape opening toward the seat rear side and outward in the seat (Continued)

width direction, and couple together the fixing portions (20) and the coupling portions (46).

14 Claims, 11 Drawing Sheets

(51) Int. Cl.
  *B60N 2/48* (2006.01)
  *B60N 2/80* (2018.01)
  *B60N 2/897* (2018.01)
(52) U.S. Cl.
  CPC ............... *B60N 2/80* (2018.02); *B60N 2/897* (2018.02); *B60N 2002/4888* (2013.01); *B60N 2002/899* (2018.02)

(56) References Cited

U.S. PATENT DOCUMENTS

| | | | |
|---|---|---|---|
| 6,386,638 B1* | 5/2002 | Strauch | B60N 2/68 297/452.18 |
| 6,779,840 B1* | 8/2004 | Farquhar | B60N 2/4228 297/216.12 |
| 6,783,177 B1* | 8/2004 | Nakano | B60N 2/4817 297/216.12 |
| 7,128,373 B2 | 10/2006 | Kurtycz et al. | |
| 7,677,659 B2* | 3/2010 | Humer | B60N 2/4228 297/216.1 |
| 7,758,114 B2* | 7/2010 | Yokota | B60N 2/4838 297/216.12 |
| 8,469,446 B2* | 6/2013 | Kanda | B60N 2/4256 297/216.14 |
| 9,090,188 B2* | 7/2015 | Imamura | B60N 2/64 |
| 9,481,279 B2* | 11/2016 | Sano | B60N 2/68 |
| 9,707,878 B2* | 7/2017 | Kish | B60N 2/68 |
| 9,718,385 B2* | 8/2017 | Yasuda | B60N 2/646 |
| 2003/0117003 A1* | 6/2003 | Fourrey | B29C 70/44 297/452.18 |
| 2004/0160108 A1* | 8/2004 | Malsch | B60N 2/4808 297/410 |
| 2005/0231019 A1* | 10/2005 | Gryp | A47C 7/40 297/452.18 |
| 2006/0202524 A1* | 9/2006 | Yamaguchi | B60N 2/4228 297/216.12 |
| 2006/0202525 A1* | 9/2006 | Yamaguchi | B60N 2/42781 297/216.12 |
| 2007/0145807 A1* | 6/2007 | Gundall | B60N 2/062 297/452.18 |
| 2008/0012402 A1* | 1/2008 | Sekida | B60N 2/4885 297/216.12 |
| 2008/0073951 A1* | 3/2008 | Hattori | B60N 2/4885 297/216.12 |
| 2009/0108661 A1* | 4/2009 | Ishijima | B60N 2/68 297/452.1 |
| 2011/0101759 A1* | 5/2011 | Otsuka | B60N 2/4228 297/391 |
| 2011/0241403 A1* | 10/2011 | Yamaguchi | B60N 2/4228 297/452.31 |
| 2013/0119737 A1* | 5/2013 | Mizobata | B60N 2/68 297/408 |
| 2013/0140859 A1* | 6/2013 | Yamaki | B60N 2/4235 297/216.13 |
| 2013/0161992 A1* | 6/2013 | Zekavica | B60N 2/20 297/354.1 |
| 2013/0341991 A1* | 12/2013 | Matsuzaki | B60N 2/68 297/452.18 |
| 2014/0375106 A1* | 12/2014 | Yamada | B60N 2/682 297/452.18 |
| 2015/0210194 A1* | 7/2015 | Furuta | B60N 2/48 297/391 |
| 2016/0023583 A1* | 1/2016 | Yasuda | B60N 2/68 297/391 |
| 2016/0096461 A1* | 4/2016 | Coppuck | B60N 2/4808 297/354.1 |
| 2016/0347223 A1* | 12/2016 | Akaike | B60N 2/682 |
| 2016/0368406 A1* | 12/2016 | Pluta | B60N 2/64 |

FOREIGN PATENT DOCUMENTS

| | | |
|---|---|---|
| DE | 3100706 A1 | 8/1982 |
| DE | 8909031 U1 | 9/1989 |
| DE | 40 31 629 C1 | 3/1992 |
| DE | 101 04 007 A1 | 8/2002 |
| DE | 10 2009 037 314 A1 | 1/2011 |
| DE | 10 2012 019 119 A1 | 1/2013 |
| EP | 1 057 691 A1 | 12/2000 |
| EP | 1 167 116 A1 | 1/2002 |
| EP | 1 880 894 A2 | 1/2008 |
| GB | 1 201 136 A | 8/1970 |
| JP | 5-34952 U | 5/1993 |
| JP | 2001-61593 A | 3/2001 |
| JP | 2002-36927 A | 2/2002 |
| JP | 2005-297950 A | 10/2005 |
| WO | 98/08705 A1 | 3/1998 |

OTHER PUBLICATIONS

Office Action dated Jul. 15, 2016 in German Patent Application No. 112014003927.6 (with English translation).

* cited by examiner

VEHICLE SEAT

TECHNICAL FIELD

The present invention relates to a vehicle seat.

BACKGROUND ART

The vehicle seat described in Japanese Utility Model Application Laid-open (JP-U) No. H5-34952 is equipped with a seat back frame configured by a panel member. The seat back frame is formed in a panel shape, and bead portions extending in the up and down direction are formed in the seat back frame. Furthermore, a support rod configured by a pipe member is disposed on the upper portion of the seat back frame, and holders that support stays of a headrest are welded to the support rod. Moreover, brackets for attaching reclining devices are fixed to the lower portion (coupling portions) of the seat back frame on both sides in the width direction of the seat back frame. Because of this, the seat back frame is coupled to a seat cushion frame.

SUMMARY OF INVENTION

Technical Subject

In this connection, in the vehicle seat described above, a load that has been input from the headrest to the holders at the time of a rear impact of the vehicle is transmitted to the coupling portions of the seat back frame via the support rod and the side portions of the seat back frame. There is room for improvement with respect to allowing the load to be efficiently transmitted to the coupling portions of the seat back frame at the time of a rear impact of the vehicle.

Solution to Subject

In consideration of the above circumstances, it is an object of the present invention to provide a vehicle seat in which a load that is input to a headrest at the time of a rear impact of the vehicle can be efficiently transmitted to coupling portions in a seat back frame formed in a panel shape.

A vehicle seat pertaining to a first aspect of the invention is equipped with: a seat cushion frame that configures a seat cushion on which a passenger sits; a seat back frame that configures a seat back that is adapted to support the back of a seated passenger, the seat back frame is formed in a panel shape and has, on a lower portion thereof on both sides in a seat width direction, coupling portions that are coupled to the seat cushion frame; fixing portions that are formed in an upper portion of the seat back frame and fix a headrest; and load transmitting portions that are disposed in the seat back frame, are each formed in a substantially L-shape opening toward the seat rear side and outward in the seat width direction or a substantially U-shape opening toward the seat rear side as seen in a plan sectional view at the position of an up and down direction intermediate portion of the seat back frame, and couple together the fixing portions and the coupling portions.

In the vehicle seat of the first aspect, the seat back frame is formed in a panel shape. The seat back frame is coupled to the seat cushion frame at the coupling portions located on the lower portion of the seat back frame on both sides in the seat width direction of the seat back frame. Furthermore, the fixing portions are formed in the upper portion of the seat back frame, and the headrest is fixed in the fixing portions.

Here, the seat back frame is disposed with the load transmitting portions that are each formed in a substantially L-shape opening toward the seat rear side and outward in the seat width direction or a substantially U-shape opening toward the seat rear side as seen in a plan sectional view at the position of the up and down direction intermediate portion of the seat back frame, and the load transmitting portions couple together the fixing portions and the coupling portions. Because of this, the load that is input from the headrest to the fixing portions at the time of a rear impact of the vehicle is directly transmitted by the load transmitting portion to the coupling portions, so the load can be efficiently transmitted to the coupling portions in the seat back frame formed in a panel shape.

A vehicle seat pertaining to a second aspect of the invention is the vehicle seat of the first aspect, wherein each of the load transmitting portions includes a first wall portion whose thickness direction coincides substantially with the seat width direction and a second wall portion whose thickness direction coincides substantially with the seat front and rear direction.

In the vehicle seat of the second aspect, the load that has been input from the headrest to the fixing portions at the time of a rear impact of the vehicle is transmitted to the first wall portions whose thickness direction coincides substantially with the seat width direction and the second wall portions whose thickness direction coincides substantially with the seat front and rear direction. Moreover, the load is transmitted along the first wall portions and the second wall portions to the coupling portions. Because of this, the load that has been input from the headrest to the fixing portions is directly transmitted by the first wall portions and the second wall portions to the coupling portions.

A vehicle seat pertaining to a third aspect of the invention is the vehicle seat of the second aspect, wherein the seat back frame includes a back panel portion that configures a central portion of the seat back frame, and the first wall portions project from the back panel portion toward the seat front side.

A vehicle seat pertaining to a fourth aspect of the invention is the vehicle seat of the second or third aspect, wherein the seat back frame includes a peripheral frame portion that configures an outer peripheral portion of the seat back frame, and the second wall portions project from the peripheral frame portion toward the seat width direction central side.

A vehicle seat pertaining to a fifth aspect of the invention is the vehicle seat of any one of the second to fourth aspects, wherein the second wall portions are joined to front end portions of the first wall portions.

In the vehicle seat of the third to fifth aspects, the first wall portions configuring the load transmitting portions are formed in the back panel portion of the seat back frame, the second wall portions configuring the load transmitting portions are formed in the peripheral frame portion, and the first wall portions and the second wall portions are joined together, so the load transmitting portions can be disposed in the seat back frame while suppressing an increase in the number of parts.

A vehicle seat pertaining to a sixth aspect of the invention is the vehicle seat of any one of the first to fifth aspects, wherein the load transmitting portions are beads in which are formed ridgelines that continuously interconnect the fixing portions and the coupling portions.

In the vehicle seat of the sixth aspect, the load transmitting portions are beads, and ridgelines that continuously interconnect the fixing portions and the coupling portions are formed in the beads. For this reason, the load that has been input to the fixing portions is transmitted along the ridgelines of the beads to the coupling portions, so the load that is input to the headrest at the time of a rear impact of the vehicle can be even more efficiently transmitted to the coupling portions.

A vehicle seat pertaining to a seventh aspect of the invention is the vehicle seat of any one of the first to sixth aspects, wherein the load transmitting portions are formed integrally with the seat back frame.

In the vehicle seat pertaining to the seventh aspect, the load transmitting portions are formed integrally with the seat back frame, so the load transmitting portions can be formed integrally with the fixing portions and the coupling portions. Because of this, the load transmitting portions can be disposed in the seat back frame while suppressing an increase in the number of parts.

A vehicle seat pertaining to an eighth aspect of the invention is the vehicle seat of any one of the first to seventh aspects, wherein the thickness dimension of the back panel portion that configures the central portion of the seat back frame is set thinner than the thickness dimension of the load transmitting portions.

In the vehicle seat of the eighth aspect, the thickness dimension of the back panel portion that configures the central portion of the seat back frame is set thinner than the thickness dimension of the load transmitting portions, so the load that is input to the fixing portions can be transmitted to the coupling portions while making the seat back frame lighter in weight.

A vehicle seat pertaining to a ninth aspect of the invention is the vehicle seat of any one of the first to eighth aspects, wherein the headrest is fixed in the fixing portions via stays that project from the headrest toward the seat lower side, and the load transmitting portions are joined to lower end portions of the fixing portions.

In the vehicle seat of the ninth aspect, the headrest is fixed in the fixing portions via the stays, and the stays project from the headrest toward the seat lower side. Additionally, when a load toward the seat rear side is input to the headrest at the time of a rear impact of the vehicle, the load toward the seat rear side acts on the upper end portions of the fixing portions through the stays, and the headrest tries to rotate obliquely toward the seat rear and lower side about the upper end portions of the fixing portions. Because of this, a load mainly toward the seat front side acts on the lower end portions of the fixing portions through the stays.

Here, the load transmitting portions are joined to the lower end portions of the fixing portions. For this reason, the load toward the seat front side acting on the lower end portions of the fixing portions through the stays can be effectively transmitted to the load transmitting portions.

A vehicle seat pertaining to a tenth aspect of the invention is the vehicle seat of any one of the first to ninth aspects, wherein, as seen from the seat front side, the load transmitting portions are curved in such a way as become convex outward in the seat width direction starting at the fixing portions and the coupling portions.

In the vehicle seat of the tenth aspect, when seen from the seat front side, the load transmitting portions are curved in such a way as to become convex outward in the seat width direction, so overlap between the load transmitting portions and the back of the seated passenger can be suppressed. Because of this, even when the load transmitting portions are disposed in the seat back frame, the load that has been input to the fixing portions can be transmitted by the load transmitting portions to the coupling portions while maintaining comfort of the seated passenger.

A vehicle seat pertaining to an eleventh aspect of the invention is the vehicle seat of any one of the first to ninth aspects, wherein, as seen from the seat front side, the load transmitting portions slope straightly outward in the seat width direction heading toward the seat lower side.

In the vehicle seat of the eleventh aspect, as seen from the seat front side, the load transmitting portions slope straightly outward in the seat width direction heading toward the seat lower side, so the load that has been input to the fixing portions can be straightly transmitted by the load transmitting portions to the coupling portions.

A vehicle seat pertaining to a twelfth aspect of the invention is the vehicle seat of any one of the first to third and sixth to ninth aspects, wherein the fixing portions that fix the headrest are disposed as a pair, and the pair of fixing portions are coupled together in the seat width direction by a coupling wall portion.

In the vehicle seat of the twelfth aspect, the fixing portions that fix the headrest are disposed as a pair, and the pair of lower fixing portions are coupled together in the seat width direction by the coupling wall portion, so the load that has been input to the fixing portions can be dispersed and transmitted to the right and left load transmitting portions.

A vehicle seat pertaining to a thirteenth aspect of the invention is the vehicle seat of the third aspect, wherein the first wall portions and the second wall portions branch from the coupling portions and extend toward the seat upper side, and the seat back frame is further equipped with a peripheral frame portion that is disposed between the first wall portions and the second wall portions, a flange portion that is disposed on an outer peripheral portion of the seat back frame and is joined to outer peripheral portions of the second wall portions, ridgelines at the boundaries between the first wall portions and the peripheral frame portion, and ridgelines at the boundaries between the second wall portions and the flange portion.

In the vehicle seat of the thirteenth aspect, the first wall portions and the second wall portions branch from the coupling portions and extend toward the seat upper side. The peripheral frame portion is disposed between the first wall portions and the second wall portions, and the flange portion is disposed on the outer peripheral portion of the seat back frame and is joined to the outer peripheral portions of the second wall portions. Additionally, the seat back frame is equipped with the ridgelines at the boundaries between the first wall portions and the peripheral frame portion and the ridgelines at the boundaries between the second wall portions and the flange portion, so the load that is input from the headrest to the fixing portions can be efficiently transmitted along the ridgelines to the coupling portions.

A vehicle seat pertaining to a fourteenth aspect of the invention is the vehicle seat of any one of the first to third and fifth to ninth aspects, wherein the load transmitting portions extend in substantially the same sectional shape from the lower ends of the fixing portions to the coupling portions as seen in a plan sectional view.

In the vehicle seat of the fourteenth aspect, the load transmitting portions extend in substantially the same sectional shape from the lower ends of the fixing portions to the coupling portions as seen in a plan sectional view, so the load that is input from the headrest to the fixing portions can be efficiently transmitted to the coupling portions.

A vehicle seat pertaining to a fifteenth aspect of the invention is the vehicle seat of any one of the first to third and fifth to ninth aspects, wherein the load transmitting portions are joined to one another at their lengthwise direction intermediate portions.

In the vehicle seat of the fifteenth aspect, the load transmitting portions are joined to one another at their lengthwise direction intermediate portions, so the load transmitting portions can be formed in a substantially X-shape as seen from the seat front side, and the torsional stiffness of the seat back frame can be raised.

A vehicle seat pertaining to a sixteenth aspect of the invention is the vehicle seat of any one of the first to ninth aspects, wherein the load transmitting portions are joined to one another at their lengthwise direction upper end portions.

In the vehicle seat pertaining to the sixteenth aspect, the load transmitting portions are joined to one another at their lengthwise direction upper end portions, so the load transmitting portions can each be formed in a triangular shape that becomes wider in width heading toward the upper side as seen in a front view, and the torsional stiffness of the seat back frame can be raised. Moreover, the load that is input from the headrest to the fixing portions can be straightly transmitted by the load transmitting portions to the coupling portions.

Advantageous Effects of Invention

According to the vehicle seat of the first aspect, the load that is input to the headrest at the time of a rear impact of the vehicle can be efficiently transmitted to the coupling portions in the seat back frame formed in a panel shape.

According to the vehicle seat of the second aspect, the load that is input from the headrest to the fixing portions at the time of a rear impact of the vehicle can be directly transmitted by the first wall portions and the second wall portions to the coupling portions.

According to the vehicle seat of the third to fifth aspects, the load transmitting portions can be disposed in the seat back frame while suppressing an increase in the number of parts.

According to the vehicle seat of the sixth aspect, the load that is input to the headrest at the time of a rear impact of the vehicle can be even more efficiently transmitted to the coupling portions.

According to the vehicle seat of the seventh aspect, the load transmitting portions can be disposed in the seat back frame while suppressing an increase in the number of parts.

According to the vehicle seat of the eighth aspect, the load that is input to the fixing portions can be transmitted to the coupling portions while making the seat back frame lighter in weight.

According to the vehicle seat of the ninth aspect, the load that is input to the fixing portions can be effectively transmitted to the load transmitting portions.

According to the vehicle seat of the tenth aspect, the load that is input to the fixing portions can be transmitted by the load transmitting portions to the coupling portions while maintaining comfort of the seated passenger.

According to the vehicle seat of the eleventh aspect, the load that is input to the fixing portions can be straightly transmitted by the load transmitting portions to the coupling portions.

According to the vehicle seat of the twelfth aspect, the load that is input to the fixing portions at the time of a rear impact of the vehicle can be dispersed and transmitted to the right and left load transmitting portions.

According to the vehicle seat of the thirteenth aspect, the load that is input from the headrest to the fixing portions can be efficiently transmitted to the coupling portions.

According to the vehicle seat of the fourteenth aspect, the load that is input from the headrest to the fixing portions can be efficiently transmitted to the coupling portions.

According to the vehicle seat of the fifteenth aspect, the load transmitting portions can be formed in a substantially X-shape as seen from the seat front side, and the torsional stiffness of the seat back frame can be raised.

According to the vehicle seat of the sixteenth aspect, the load transmitting portions can each be formed in a triangular shape that becomes wider in width heading toward the upper side as seen in a front view, the torsional stiffness of the seat back frame can be raised, and the load that is input from the headrest to the fixing portions can be transmitted straightly by the load transmitting portions to the coupling portions.

DESCRIPTION OF EMBODIMENTS

First Embodiment

Figure 1:
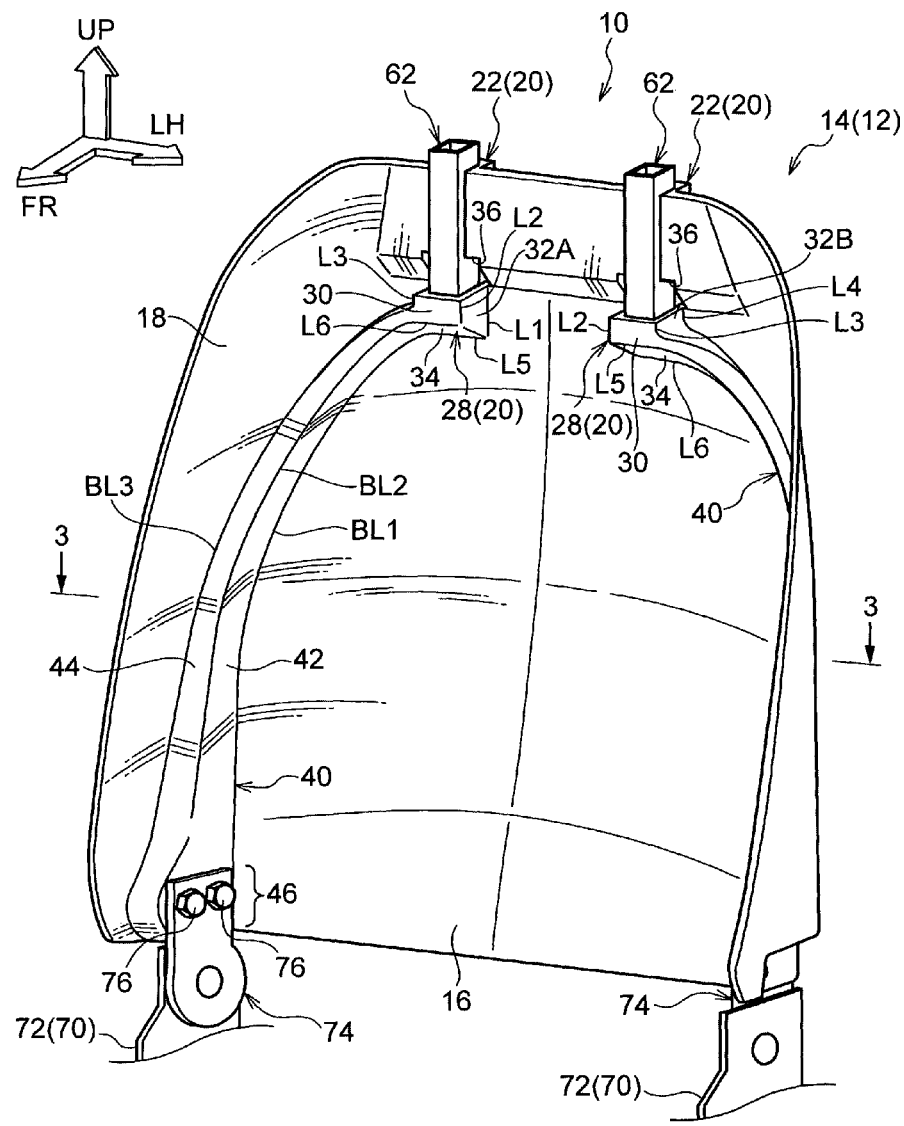
FIG. 1 is a perspective view showing an entire seat back frame used in a vehicle seat pertaining to a first embodiment as seen obliquely from the seat front and left side.

A vehicle seat 10 pertaining to a first embodiment will be described below using FIG. 1 to FIGS. 5A and 5B. Arrow FR appropriately shown in the drawings indicates a seat front direction, arrow UP indicates a seat upper direction, and arrow LH indicates a seat left direction (one side in the seat width direction). Furthermore, the seat front direction, the seat upper direction, and the seat left direction coincide with the vehicle front direction, the vehicle upper direction, and the vehicle left direction, respectively.

Figure 2:
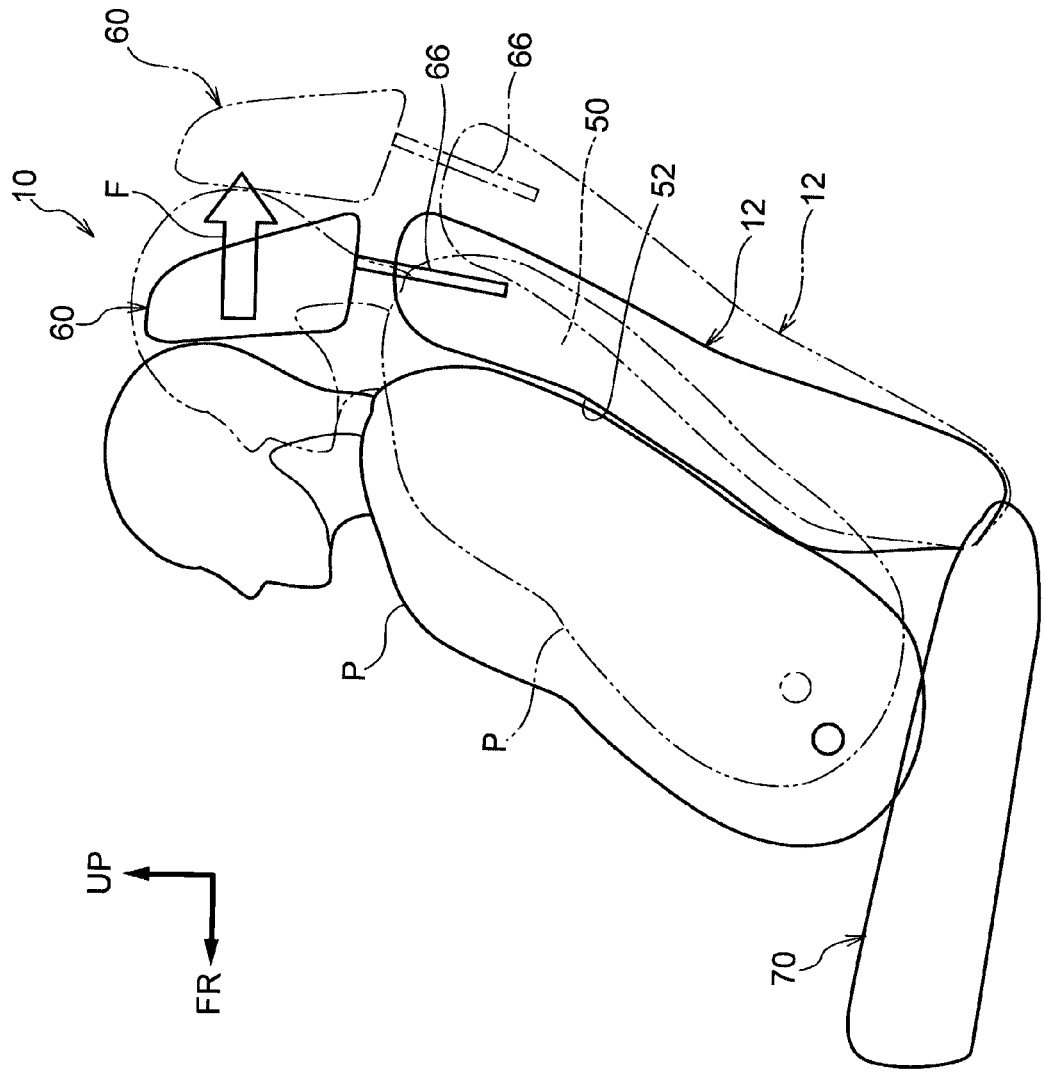
FIG. 2 is a side view showing the entire vehicle seat pertaining to the first embodiment as seen from the seat left side.

As shown in FIG. 2, the vehicle seat 10 is configured to include a seat back 12 that supports the back of a seated passenger P and a headrest 60 that supports the head of the seated passenger P.

The seat back 12 is disposed in an upright state on the rear end portion of a seat cushion 70 on which the passenger P sits. As shown in FIG. 1, a seat back frame 14 that forms the skeletal member of the seat back 12 is disposed inside the seat back 12. The seat back frame 14 is made of a resin material (e.g., carbon fiber reinforced plastic) and is configured as a shell pattern frame that is formed in a panel shape overall and has a so-called shell shape opening toward the seat front side. Additionally, conventionally known reclining mechanisms 74 are fixed to the lower portion of the seat back frame 14 on both sides in a seat width direction of the seat back frame 14, and the reclining mechanisms 74 are fixed to the end portion in a rear direction of a seat cushion frame 72 that forms the skeletal member of the seat cushion 70. A seat back pad 50 configured by a urethane or other foam material is disposed on the seat front side of the seat back frame 14, and the seat back pad 50 is covered by a cover 52 (see FIG. 2).

The seat back frame 14 is configured to include a back panel portion 16 that configures the central portion of the seat back frame 14 and a peripheral frame portion 18 that configures the outer peripheral portion of the seat back frame 14. The back panel portion 16 is formed in a substantially panel shape and is disposed in such a way that its thickness direction coincides substantially with the seat front and rear direction. Furthermore, as seen from the seat front side, the outer peripheral portion of the back panel portion 16 is formed in a substantially inverted U-shape (specifically, an arch shape that becomes convex toward the seat upper side), and as seen in a plan sectional view seen from the seat upper side, the back panel portion 16 is curved in such a way as to become convex toward the seat rear side (see FIG. 3).

The peripheral frame portion 18 is formed in a substantially inverted U-shaped panel shape opening toward the seat lower side as seen in a front view and is joined to the outer peripheral portion of the back panel portion 16. Both side sections in the seat width direction of the peripheral frame portion 18 are joined to the back panel portion 16 via later-described vertical wall beads 40. Additionally, the upper portion of the peripheral frame portion 18 is disposed in such a way that its thickness direction coincides substantially with the seat front and rear direction, and the both side sections in the seat width direction of the peripheral frame portion 18 are formed in such a way as to be bent toward the seat front side heading toward the seat lower side.

Figure 4:
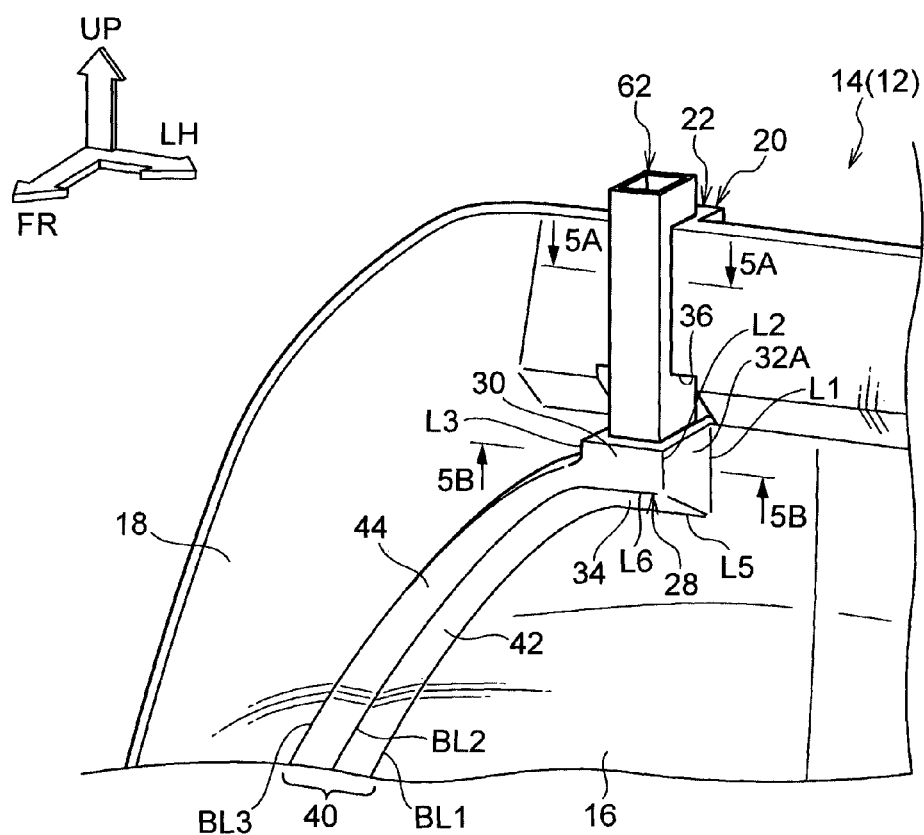
FIG. 4 is an enlarged perspective view showing a bracket fixing portion shown in FIG. 1.

As shown also in FIG. 4, a pair of bracket fixing portions 20 serving as "fixing portions" are integrally formed in the upper portion of the seat back frame 14. The bracket fixing portions 20 are configured to be bilaterally symmetrical relative to the seat width direction central portion of the seat back frame 14. The bracket fixing portions 20 are each configured to include an upper fixing portion 22 that configures the upper portion of the bracket fixing portion 20 and a lower fixing portion 28 that configures the lower portion of the bracket fixing portion 20.

Figure 5A:
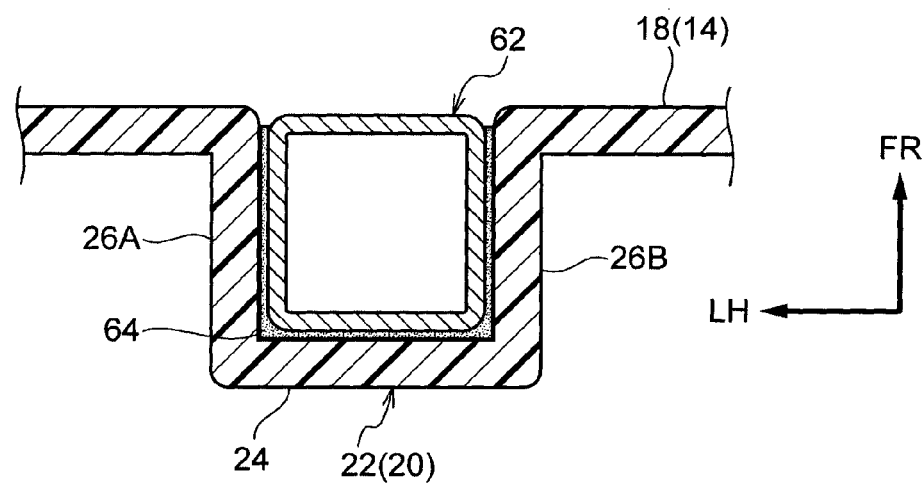
FIG. 5A is a sectional view taken along line 5A-5A with respect to an upper fixing portion shown in FIG. 4 as seen from the seat upper side.

The upper fixing portions 22 are formed in the upper end portion of the peripheral frame portion 18. As shown in FIG. 5A, the upper fixing portions 22 are each formed in a substantially concave shape opening toward the seat front side as seen in a plan sectional view, project from the peripheral frame portion 18 toward the seat rear side, and extend in the seat up and down direction. Specifically, the upper fixing portions 22 each has an upper rear wall portion 24 whose thickness direction coincides with the seat front and rear direction and a pair of upper side wall portions 26A and 26B that extend substantially perpendicularly from both seat width direction ends of the upper rear wall portion 14 toward the seat front side, and the front end portions of the pair of upper side wall portions 26A and 26B are joined to the peripheral frame portion 18.

Figure 5B:
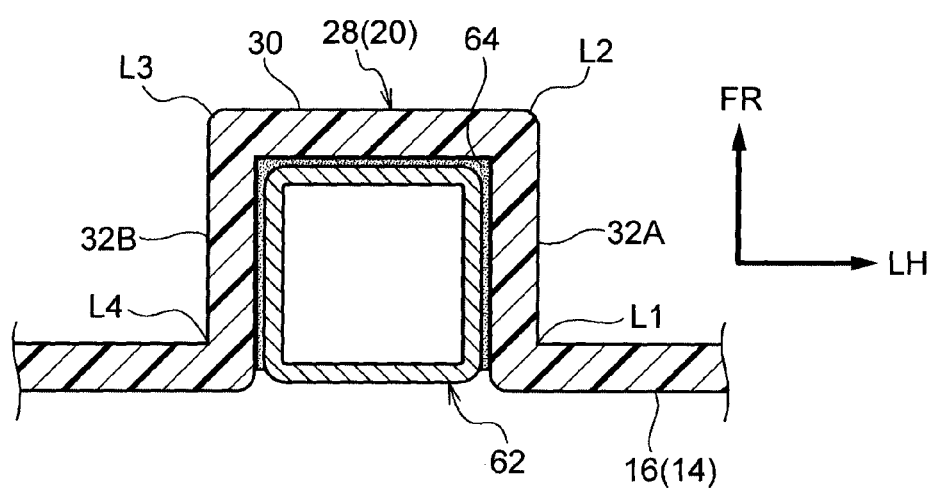
FIG. 5B is a sectional view taken along line 5B-5B with respect to a lower fixing portion shown in FIG. 4 as seen from the seat lower side.

As shown in FIG. 1, the lower fixing portions 28 are disposed on the upper end portion of the back panel portion 16 and on the seat lower side of the upper fixing portions 22. The lower fixing portions 28 are formed in substantially concave shapes opening toward the seat rear side as seen in a plan sectional view and project from the back panel portion 16 toward the seat front side. Specifically, as shown in FIG. 5B, the lower fixing portions 28 each has a lower front wall portion 30 whose thickness direction coincides with the seat front and rear direction and a pair of lower side wall portions 32A and 32B that extend substantially perpendicularly from both seat width direction ends of the lower front wall portion 30 toward the seat rear side, and the rear end portions of the pair of lower side wall portions 32A and 32B are joined to the back panel portion 16. Furthermore, as shown in FIG. 4, a lower bottom wall portion 34 is formed on the lower end of each of the lower fixing portions 28, and the lower bottom wall portions 34 are joined to the back panel portion 16 and close off the lower ends of the lower fixing portions 28.

Furthermore, the positions, in the seat width direction, of the upper side wall portions 26A and 26B and the lower side wall portions 32A and 32B that form pairs in the seat up and down direction coincide with one another, and the upper rear wall portions 24 are disposed on the seat rear side relative to the lower front wall portions 30. Because of this, the regions surrounded by the upper fixing portions 22 and the lower fixing portions 28 have substantially rectangular shapes as seen in a plan view. Moreover, substantially rectangular hole portions 36 running in the seat front and rear direction are formed in the peripheral frame portion 18 between the upper fixing portions 22 and the lower fixing portions 28.

Additionally, ridgelines of the lower fixing portions 28 extending in the seat up and down direction are ridgelines L1, L2, L3, and L4 (see FIG. 5B), and ridgelines of the lower bottom wall portions 34 of the lower fixing portions 28 extending in the seat width direction are ridgelines L5 and L6 (see FIG. 4).

Furthermore, support brackets 62 (which are elements to be broadly understood as "support members") for supporting the headrest 60 are fixed in the upper fixing portions 22 and the lower fixing portions 28. The support brackets 62 are formed in substantially rectangular tubular shapes and are disposed in such a way that their lengthwise direction coincides with the seat up and down direction. Additionally, parts of the upper portions of the support brackets 62 (the sections of the brackets 62 on the seat upper side of the seat up and down direction central portions) are disposed inside the upper fixing portions 22 and are fixed to the upper fixing portions 22 via an adhesive 64 (see FIG. 5A). Furthermore, parts of the lower portions of the support brackets 62 (the sections of the support brackets 62 on the seat lower side of the seat up and down direction central portions) are disposed inside the lower fixing portions 28 and are fixed to the lower fixing portions 28 via the adhesive 64 (see FIG. 5B).

Moreover, substantially tubular headrest supports (not shown in the drawings) are held inside the support brackets 62. Stays 66 (see FIG. 2) that project from the headrest 60 toward the seat lower side are inserted inside the headrest supports, and the stays 66 are supported by the headrest supports. Because of this, the headrest 60 is fixed (supported) by the bracket fixing portions 20 of the seat back frame 14 via the stays 66, the headrest supports, and the support brackets 62.

Next, the vertical wall beads 40, which are the main portions of the present invention, will be described. The vertical wall beads 40 correspond to "load transmitting portions" and "beads" of the present invention.

As shown in FIG. 1, the vertical wall beads 40 are formed integrally with the seat back frame 14. The vertical wall beads 40 extend from the lower end portions of the bracket fixing portions 20 (the lower fixing portions 28) and along the joint section between the back panel portion 16 and the peripheral frame portion 18 toward the seat lower side as far as the lower end of the seat back frame 14. That is, a pair of the vertical wall beads 40 are formed integrally with the seat back frame 14, and the vertical wall beads 40 are curved in such a way as to become convex outward in the seat width direction as seen in a front view.

Figure 3:
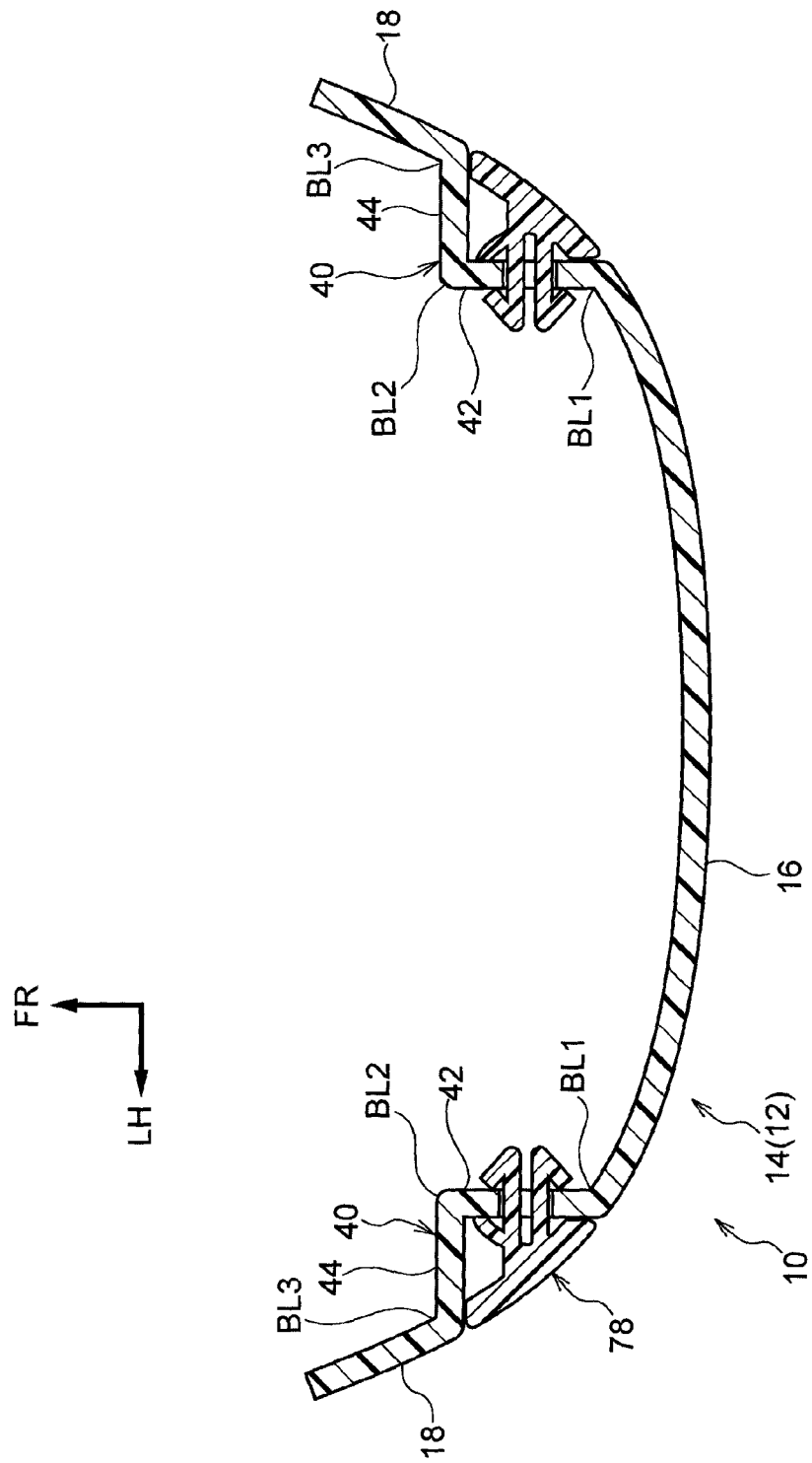
FIG. 3 is a sectional view taken along line 3-3 with respect to the seat back frame of FIG. 1 as seen from the seat upper side.

As shown in FIG. 3, the vertical wall beads 40 are each formed in a substantially L-shape opening toward the seat rear side and outward in the seat width direction as seen in a plan sectional view at the position of the seat up and down direction intermediate portion of the seat back frame 14 and are each configured to include a first wall portion 42 and a second wall portion 44.

The first wall portions 42 are disposed in such a way that their thickness direction coincides substantially with the seat width direction and project from the back panel portion 16 toward the seat front side as seen in a plan sectional view at the position of the seat up and down direction intermediate portion of the seat back frame 14. Furthermore, as shown in FIG. 1, the first wall portions 42 are curved in such a way that their thickness direction becomes coincident with the substantially seat up and down direction heading toward the seat upper side, and the upper ends of the first wall portions 42 are smoothly joined to the lower bottom wall portions 34 of the lower fixing portions 28.

The aforementioned reclining mechanisms 74 are fastened and fixed by bolts 76 to the lower end portions of the first wall portions 42. Because of this, the seat back frame 14 is coupled to the seat cushion frame 72 via the reclining mechanisms 74. Additionally, the sections of the vertical wall beads 40 to which the reclining mechanisms 74 are fixed are coupling portions 46, and the first wall portions 42 at the coupling portions 46 are disposed in such a way that their thickness direction coincides with the seat width direction. Although they are not shown in the drawings, insertion holes through which the bolts 76 are inserted are formed in the first wall portions 42, and the insertion holes are disposed adjacent to one another in the seat front and rear direction.

As shown in FIG. 3, the second wall portions 44 are disposed in such a way that their thickness direction coincides substantially with the seat front and rear direction, project from the peripheral frame portion 18 toward the seat width direction central side, and are joined to the front end portions of the first wall portions 42 as seen in a plan sectional view at the position of the seat up and down direction intermediate portion of the seat back frame 14.

Furthermore, the upper end portions of the second wall portions 44 are smoothly joined to the lower front wall portions 30 (see FIG. 1). Additionally, the thickness of the first wall portions 42 and the second wall portions 44 of the vertical wall beads 40 is set to the same thickness as the thickness of the back panel portion 16 and the peripheral frame portion 18 of the seat back frame 14.

As shown in FIG. 1, ridgelines BL1 at the boundaries between the first wall portions 42 and the back panel portion 16, ridgelines BL2 at the boundaries between the first wall portions 42 and the second wall portions 44, and ridgelines BL3 at the boundaries between the second wall portions 44 and the peripheral frame portion 18 are each configured as single curved ridgelines. Additional, the ridgelines BL1 are connected to the ridgelines L5 of the lower fixing portions 28, the ridgelines BL2 are connected to the ridgelines L6 of the lower fixing portions 28, and the ridgelines BL3 are connected to the ridgelines L3 of the lower fixing portions 28. Because of this, the ridgelines BL1 to BL3 of the vertical wall beads 40 extend continuously between the bracket fixing portions 20 and the coupling portions 46, and the bracket fixing portions 20 and the coupling portions 46 are interconnected by the vertical wall beads 40. The ridgelines BL1 to BL3 of the vertical wall beads 40 are each configured as single curved ridgelines, but the ridgelines BL1 to BL3 may also each be configured as single ridgelines by interconnecting plural straight ridgelines, for example. That is, the "ridgelines that continuously interconnect the fixing portions and the coupling portions" of the present invention also includes a case where plural ridgelines are connected to one another to configure single ridgelines.

As shown in FIG. 3, on the seat rear side of the seat back frame 14, garnishes 78 are attached as a result of being snap-fitted, for example, in positions corresponding to the vertical wall beads 40. The outer peripheral portions of the garnishes 78 are formed in substantially circular arc shapes along the rear surface of the seat back frame 14 as seen in a plan sectional view. Because of this, the rear surface of the back panel portion 16 and the rear surface of the peripheral frame portion 18 are configured to be smoothly interconnected by the outer peripheral portions of the garnishes 78.

Next, the action and effects of the present embodiment will be described.

In the vehicle seat 10 configured as described above, the seat back frame 14 is configured by a resin material and is formed in a panel shape. Furthermore, the support brackets 62 are fixed in the bracket fixing portions 20 of the seat back frame 14, and the headrest supports are held inside the support brackets 62. Additionally, the stays 66 that project from the headrest 60 toward the seat lower side are supported inside the headrest supports. Because of this, the headrest 60 is fixed (supported) by the bracket fixing portions 20 of the seat back frame 14 via the stays 66, the headrest supports, and the support brackets 62.

Furthermore, the reclining mechanisms 74 are fastened and fixed to the coupling portions 46 of the seat back frame 14, and the seat back frame 14 is coupled to the seat cushion frame 72 via the reclining mechanisms 74.

Additionally, at the time of a rear impact of the vehicle, the head of the seated passenger P moves toward the seat rear side because of inertial force, and an impact load F toward the seat rear side acts on the headrest 60 from the head of the seated passenger P (see FIG. 2). When the impact load F toward the seat rear side acts on the headrest 60, the headrest 60 tries to rotate obliquely toward the seat rear and lower side about the upper ends of the support brackets 62 disposed on the seat lower side of the headrest 60. For this reason, mainly a load toward the seat rear side acts on the upper ends of the support brackets 62, and mainly a load toward the seat front side acts on the lower portions of the support brackets 62. Because of this, mainly the load toward the seat rear side is input to the upper fixing portions 22 while mainly the load toward the seat front side is input to the lower fixing portions 28.

Here, the vertical wall beads 40 are formed integrally with the seat back frame 14, and the vertical wall beads 40 are joined to the bracket fixing portions 20 and the coupling portions 46 and couple together the bracket fixing portions 20 and the coupling portions 46 in the seat up and down direction. Additionally, the load that has been input to the upper fixing portions 22 of the bracket fixing portions 20 is transmitted via the peripheral frame portion 18 to the vertical wall beads 40, and the load that has been input to the lower fixing portions 28 of the bracket fixing portions 20 is transmitted to the vertical wall beads 40. Moreover, the load that has been input to the vertical wall beads 40 is transmitted along the vertical wall beads 40 to the coupling portions 46. Because of this, the load that has been input from the headrest 60 to the bracket fixing portions 20 at the time of a rear impact of the vehicle is directly transmitted by the vertical wall beads 40 to the coupling portions 46. Consequently, the impact load F that is input to the headrest 60 at the time of a rear impact of the vehicle can be efficiently transmitted to the coupling portions 46 in the seat back frame 14 formed in a panel shape.

Furthermore, because the vertical wall beads 40 are formed integrally with the seat back frame 14 as described above, the vertical wall beads 40 can be disposed in the seat back frame 14 while suppressing an increase in the number of parts.

Moreover, the ridgelines BL1 to BL3 that continuously interconnect the bracket fixing portions 20 and the coupling portions 46 are formed in the vertical wall beads 40. Additionally, the ridgelines BL1 are connected to the ridgelines L5 of the lower fixing portions 28, the ridgelines BL2 are connected to the ridgelines L6 of the lower fixing portions 28, and the ridgelines BL3 are connected to the ridgelines L3 of the lower fixing portions 28. For this reason, the load that has been input to the bracket fixing portions 20 (the lower fixing portions 28) is transmitted along the ridgelines BL1 to BL3 of the vertical wall beads 40 to the coupling portions 46, so the load that is input to the headrest 60 at the time of a rear impact of the vehicle can be even more efficiently transmitted to the coupling portions 46.

Furthermore, the second wall portions 44 of the vertical wall beads 40 are joined to the lower end portions of the lower front wall portions 30 of the lower fixing portions 28, and the first wall portions 42 of the vertical wall beads 40 are joined to the lower bottom wall portions 34 of the lower fixing portions 28. For this reason, compared to a case supposing that the vertical wall beads 40 are joined to the seat up and down direction intermediate portions of the bracket fixing portions 20, the load that has been input to the bracket fixing portions 20 can be effectively transmitted to the vertical wall beads 40.

That is, as described above, at the time of a rear impact of the vehicle, mainly a load toward the seat rear side is input to the upper fixing portions 22 while mainly a load toward the seat front side is input to the lower fixing portions 28. For this reason, because the second wall portions 44 are joined to the lower end portions of the lower front wall portions 30 and the first wall portions 42 are joined to the lower bottom wall portions 34, the load that has been input to the lower fixing portions 28 is directly transmitted to the vertical wall beads 40. Because of this, compared to a case supposing that the vertical wall beads 40 are joined to the seat up and down direction intermediate portions of the bracket fixing portions 20, the load that has been input to the bracket fixing portions 20 can be effectively transmitted to the vertical wall beads 40.

Furthermore, as seen from the seat front side, the vertical wall beads 40 are curved in such a way as to become convex outward in the seat width direction starting at the bracket fixing portions 20 and the coupling portions 46. Because of this, the vertical wall beads 40 can be disposed in such a way as to suppress overlap between the vertical wall beads 40 and the back of the seated passenger P. Consequently, even when the vertical wall beads 40 are disposed in the seat back frame 14, the load that has been input to the bracket fixing portions 20 can be transmitted by the vertical wall beads 40 to the coupling portions 46 while maintaining comfort with respect to the seated passenger P.

Moreover, the vertical wall beads 40 extend from the lower end portions of the bracket fixing portions 20 (the lower fixing portions 28) and along the joint section between the back panel portion 16 and the peripheral frame portion 18 toward the seat lower side as far as the lower end of the seat back frame 14. That is, the vertical wall beads 40 are disposed on the seat width direction inner side of the outer peripheral portion of the seat back frame 14. For this reason, compared to a seat back frame like in the conventional art, the thickness of both side portions (the peripheral frame portion 18) of the seat back frame 14 can be set thin, and therefore the thickness of both side portions of the vehicle seat 10 can be set thin.

Second Embodiment

Figure 6A:
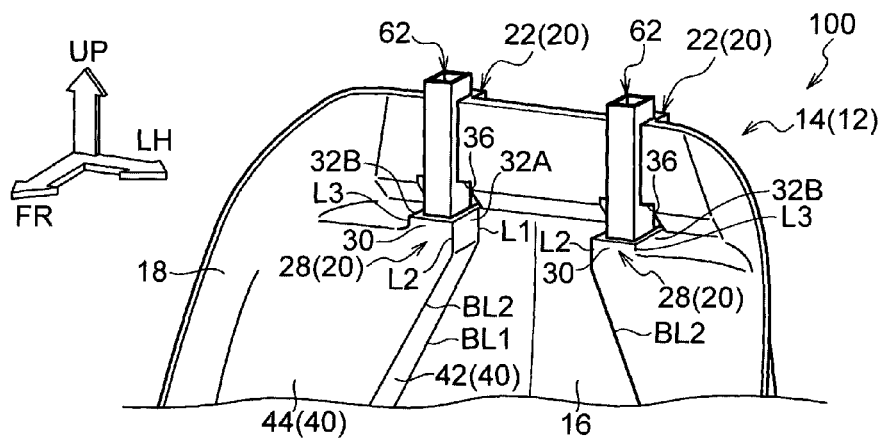
FIG. 6A is a perspective view showing the upper portion of the seat back frame used in a vehicle seat pertaining to a second embodiment as seen obliquely from the seat front and left side.

A vehicle seat 100 pertaining to a second embodiment will be described below using FIG. 6A. The second embodiment is configured in the same way as the first embodiment except for the points described below.

That is, in the second embodiment, the upper ends of the first wall portions 42 of the vertical wall beads 40 of the seat back frame 14 are joined to the lower ends of the lower side wall portions 32A on the seat width direction central side of the lower fixing portions 28. Because of this, the ridgelines BL1 of the vertical wall beads 40 are connected to the ridgelines L1 of the lower fixing portions 28, and the ridgelines BL2 of the vertical wall beads 40 are connected to the ridgelines L2 of the lower fixing portions 28. Furthermore, as seen from the seat front side, the first wall portions 42 slope straightly outward in the seat width direction heading toward the seat lower side.

Because of this, in the second embodiment also, the load that is input from the headrest 60 to the bracket fixing portions 20 at the time of a rear impact of the vehicle is directly transmitted by the vertical wall beads 40 to the coupling portions 46, so the second embodiment achieves the same action and effects as the first embodiment except for the point of suppressing overlap between the vertical wall beads 40 and the back of the seated passenger P.

Furthermore, in the second embodiment, the upper ends of the first wall portions 42 are joined to the lower ends of the lower side wall portions 32A of the lower fixing portions 28, and the first wall portions 42 extend from the lower side wall portions 32A toward the seat lower side. For this reason, mainly the load that is input to the lower side wall portions 32A can be efficiently transmitted along the ridgelines BL1 and BL2 of the vertical wall beads 40 to the coupling portions 46.

Variations of Second Embodiment

Two variations of the second embodiment, in which the places where the upper ends of the first wall portions 42 are joined to the lower fixing portions 28 are changed, will be described below.

Figure 6B:
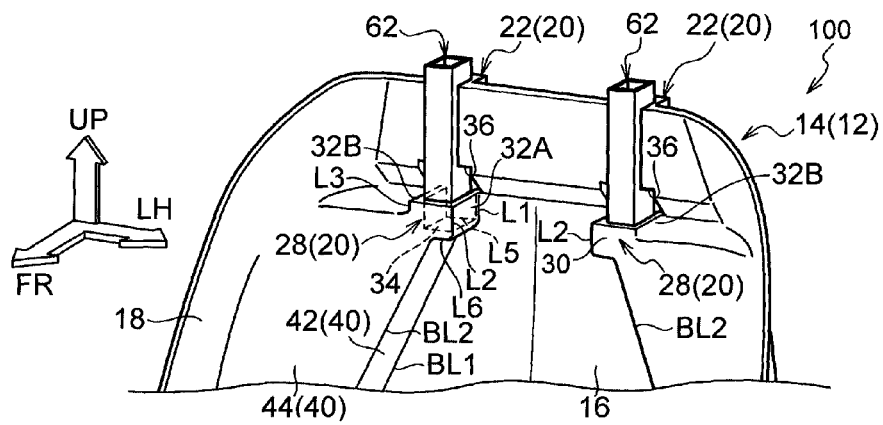
FIG. 6B is a perspective view corresponding to FIG. 6A showing an example of a variation of the seat back frame of the second embodiment.

As shown in FIG. 6B, in variation 1, the upper ends of the first wall portions 42 are joined to the seat width direction intermediate portions of the lower bottom wall portions 34 of the lower fixing portions 28. Because of this, the ridgelines BL1 of the vertical wall beads 40 are connected to the ridgelines L5 of the lower fixing portions 28, and the ridgelines BL2 of the vertical wall beads 40 are connected to the ridgelines L6 of the lower fixing portions 28. Additionally, in this case, mainly the load that is input to the lower front wall portions 30 and the lower bottom wall portions 34 can be efficiently transmitted along the ridgelines BL1 and BL2 of the vertical wall beads 40 to the coupling portions 46.

Figure 6C:
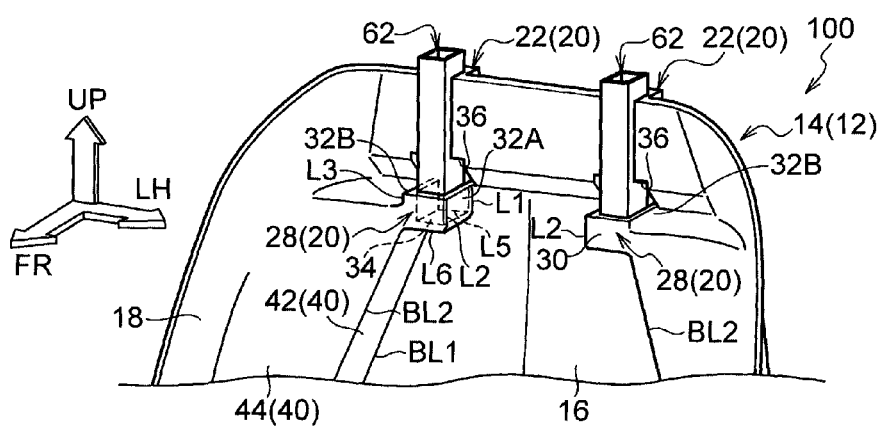
FIG. 6C is a perspective view corresponding to FIG. 6A showing another example of a variation of the seat back frame of the second embodiment.

As shown in FIG. 6C, in variation 2, the upper ends of the first wall portions 42 are joined to the lower ends of the lower bottom wall portions 34 on the seat width direction outer sides of the lower fixing portions 28. Because of this, the ridgelines BL1 of the vertical wall beads 40 are connected to the ridgelines L5 of the lower fixing portions 28, and the ridgelines BL2 of the vertical wall beads 40 are connected to the ridgelines L6 of the lower fixing portions 28. Additionally, in this case, mainly the load that has been input to the lower side wall portions 32B and the lower bottom wall portions 34 can be efficiently transmitted along the ridgelines BL1 and BL2 of the vertical wall beads 40 to the coupling portions 46.

Third Embodiment

Figure 7:
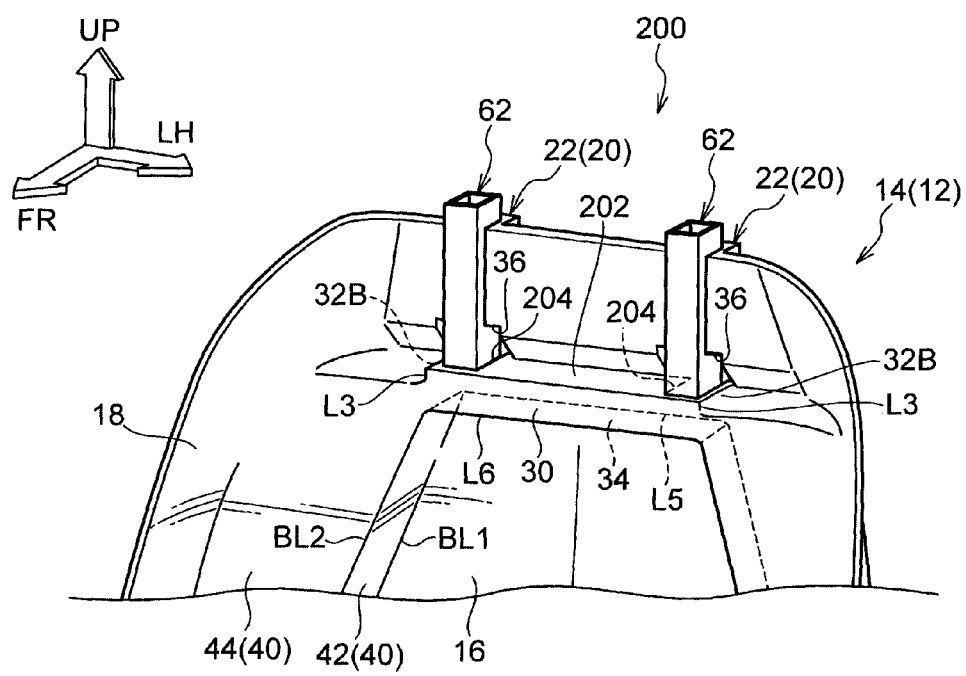
FIG. 7 is a perspective view showing the upper portion of the seat back frame used in a vehicle seat pertaining to a third embodiment as seen obliquely from the seat front and left side.

A vehicle seat 200 pertaining to a third embodiment will be described using FIG. 7. The third embodiment is configured in the same way as the second embodiment except for the points described below.

That is, in the third embodiment, the pair of lower fixing portions 28 are coupled to one another in the seat width direction. Specifically, the lower front wall portions 30 and the lower bottom wall portions 34 of the pair of lower fixing portions 28 extend toward the seat width direction central side and are joined to one another. Furthermore, a coupling wall portion 202 is formed between the pair of lower fixing portions 28, and the coupling wall portion 202 interconnects upper edges 204 of the lower side wall portions 32A disposed on the seat width direction central side of the lower fixing portions 28.

Furthermore, the upper ends of the first wall portions 42 of the vertical wall beads 40 are joined to the lower ends of the lower side wall portions 32B on the seat width direction outer sides of the lower fixing portions 28. That is, the upper ends of the first wall portions 42 are joined to the lower fixing portions 28 in the same way as in variation 2 of the second embodiment. Because of this, the right and left vertical wall beads 40 are coupled together by the section that couples together the pair of lower fixing portions 28.

Additionally, in the third embodiment also, the load that is input from the headrest 60 to the bracket fixing portions 20 at the time of a rear impact of the vehicle is directly transmitted by the vertical wall beads 40 to the coupling portions 46. For this reason, the third embodiment also achieves the same action and effects as the second embodiment.

Furthermore, in the third embodiment, the right and left vertical wall beads 40 are coupled together by the section that couples together the pair of lower fixing portions 28, so the load that has been input to the bracket fixing portions 20 at the time of a rear impact of the vehicle can be dispersed and transmitted to the right and left vertical wall beads 40.

Fourth Embodiment

Figure 8:
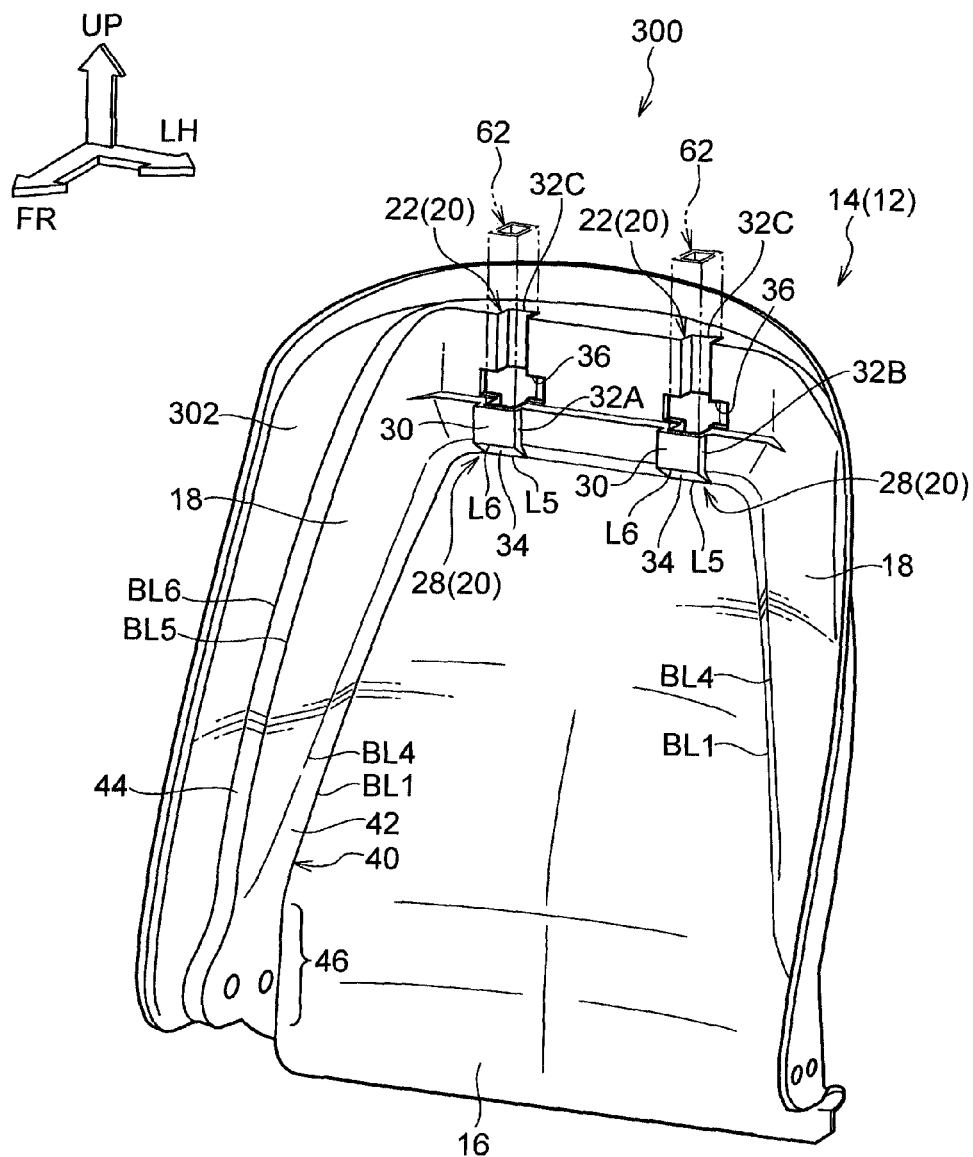
FIG. 8 is a perspective view showing the entire seat back frame used in a vehicle seat pertaining to a fourth embodiment as seen obliquely from the seat front and left side.

A vehicle seat 300 pertaining to a fourth embodiment will be described below using FIG. 8. The fourth embodiment is configured in the same way as the first embodiment except for the points described below.

That is, in the fourth embodiment, the back panel portion 16 is formed in a substantially trapezoidal shape as seen in a front view. Furthermore, the first wall portions 42 and the second wall portions 44 of the vertical wall beads 40 branch from the coupling portions 46 and extend toward the seat upper side, and the peripheral frame portion 18 is disposed between the first wall portions 42 and the second wall portions 44. That is, in the fourth embodiment, the vertical wall beads 40 are configured to include both side sections in the seat width direction of the peripheral frame portion 18. Additionally, the pair of second wall portions 44 extend along the outer peripheral portion of the peripheral frame portion 18 and are joined to one another at the upper portion of the seat back frame 14. Because of this, the second wall portions 44 are formed in a substantially U-shape opening toward the seat lower side as seen in a front view. Moreover, a flange portion 302 is disposed on the outer peripheral portion of the seat back frame 14, and the flange portion 302 is joined to the outer peripheral portions of the second wall portions 44.

Additionally, ridgelines at the boundaries between the first wall portions 42 and the peripheral frame portion 18 are ridgelines BL4. Furthermore, ridgelines at the boundaries between the peripheral frame portion 18 and the second wall portions 44 are ridgelines BL5. Ridgelines at the boundaries between the second wall portions 44 and the flange portion 302 are ridgelines BL6, and the ridgelines BL5 are connected to upper edges 32C of the upper fixing portions 22. That is, in the fourth embodiment, the ridgelines BL5 of the vertical wall beads 40 are connected to the upper edges 32C of the upper fixing portions 22, and the ridgelines BL1 of the vertical wall beads 40 are connected to the ridgelines L5 of the lower fixing portions 28.

Because of this, in the fourth embodiment also, the load that is input from the headrest 60 to the bracket fixing portions 20 at the time of a rear impact of the vehicle is directly transmitted by the vertical wall beads 40 to the coupling portions 46, so the fourth embodiment achieves the same action and effects as the first embodiment.

Furthermore, in the fourth embodiment, the ridgelines BL5 of the vertical wall beads 40 are connected to the upper edges 32C of the upper fixing portions 22. For this reason, the load toward the seat rear side that is input to the upper fixing portions 22 can be efficiently transmitted along the ridgelines BL5 to the coupling portions 46. Because of this, the load that is input from the headrest 60 to the bracket fixing portions 20 at the time of a rear impact of the vehicle can be effectively transmitted by the vertical wall beads 40 to the coupling portions 46.

Fifth Embodiment

Figure 9A:
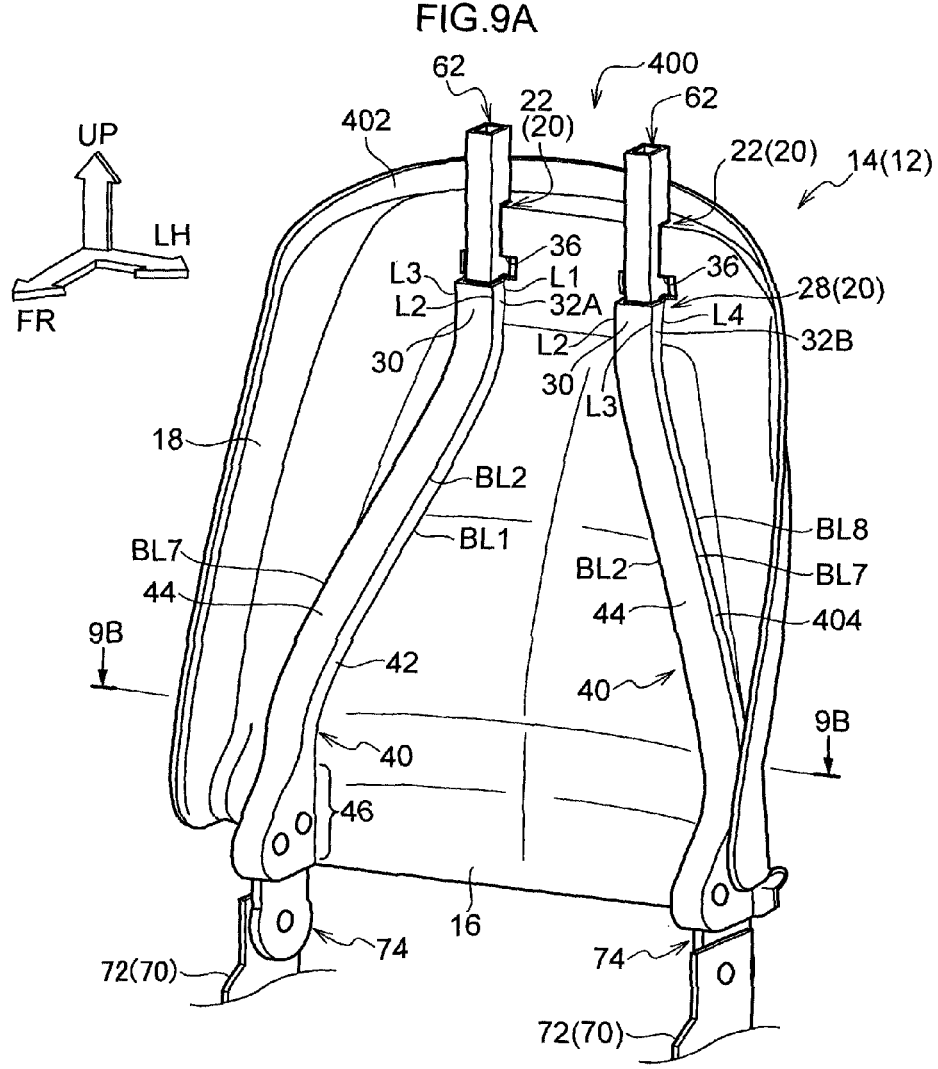
FIG. 9A is a perspective view showing the entire seat back frame used in a vehicle seat pertaining to a fifth embodiment as seen obliquely from the seat front and left side.
Figure 9B:
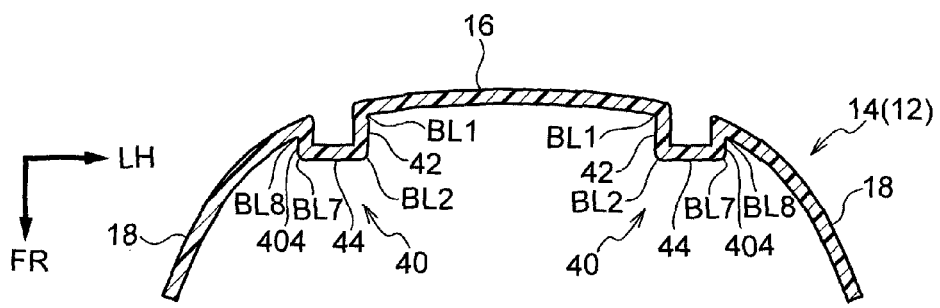
FIG. 9B is a sectional view taken along line 9B-9B with respect to the seat back frame shown in FIG. 9A as seen from the seat upper side.

A vehicle seat 400 pertaining to a fifth embodiment will be described below using FIGS. 9A and 9B. The fifth embodiment is configured in the same way as the first embodiment except for the points described below.

That is, in the fifth embodiment, the back panel portion 16 is formed in a substantially trapezoidal shape as seen from the seat front side. Furthermore, a flange portion 402 is formed integrally with the outer peripheral section of the peripheral frame portion 18. Moreover, the vertical wall beads 40 are formed integrally with the back panel portion 16, have substantially the same sectional shape as the lower fixing portions 28 as seen in a plan sectional view, and extend continuously from the lower fixing portions 28 toward the seat lower side. That is, the vertical wall beads 40 are each formed in a substantially U-shape opening toward the seat rear side as seen in a plan sectional view and project from the back panel portion 16 toward the seat front side.

Furthermore, the second wall portions 44 of the vertical wall beads 40 configure the wall portions on the seat front side of the vertical wall beads 40, and the first wall portions 42 extend from central side end portions in the seat width direction of the second wall portions 44 toward the seat rear side. Moreover, wall portions that extend from outside end portions in the seat width direction of the second wall portions 44 toward the seat rear side are third wall portions 404. Additionally, ridgelines at the boundaries between the second wall portions 44 and the third wall portions 404 are ridgelines BL7, and ridgelines at the boundaries between the third wall portions 404 and the back panel portion 16 are ridgelines BL8.

Furthermore, the lower bottom wall portions 34 are omitted from the bracket fixing portions 20. Additionally, the ridgelines BL1 of the vertical wall beads 40 are connected to the ridgelines L1 of the lower fixing portions 28, and the ridgelines BL2 of the vertical wall beads 40 are connected to the ridgelines L2 of the lower fixing portions 28. Moreover, the ridgelines BL7 of the vertical wall portions 40 are connected to the ridgelines L3 of the lower fixing portions 28, and the ridgelines BL8 of the vertical wall beads 40 are connected to the ridgelines L4 of the lower fixing portions 28.

The reclining mechanisms 74 are disposed between the first wall portions 42 and the third wall portions 404 of the vertical wall beads 40, and the first wall portions 42 and the third wall portions 404 at the coupling portions 46 are disposed in such a way that their thickness direction coincides with the seat width direction.

Additionally, in the fifth embodiment also, the load that is input from the headrest 60 to the bracket fixing portions 20 at the time of a rear impact of the vehicle is directly transmitted by the vertical wall beads 40 to the coupling portions 46. For this reason, the fifth embodiment also achieves the same action and effects as the first embodiment except for the point of suppressing overlap between the vertical wall beads 40 and the back of the seated passenger P.

Furthermore, in the fifth embodiment, the lower fixing portions 28 and the vertical wall beads 40 have substantially the same sectional shape and extend in the seat up and down direction, so the load that has been input to the bracket fixing portions 20 (the lower fixing portions 28) can be even more efficiently transmitted to the coupling portions 46.

Sixth Embodiment

Figure 10:
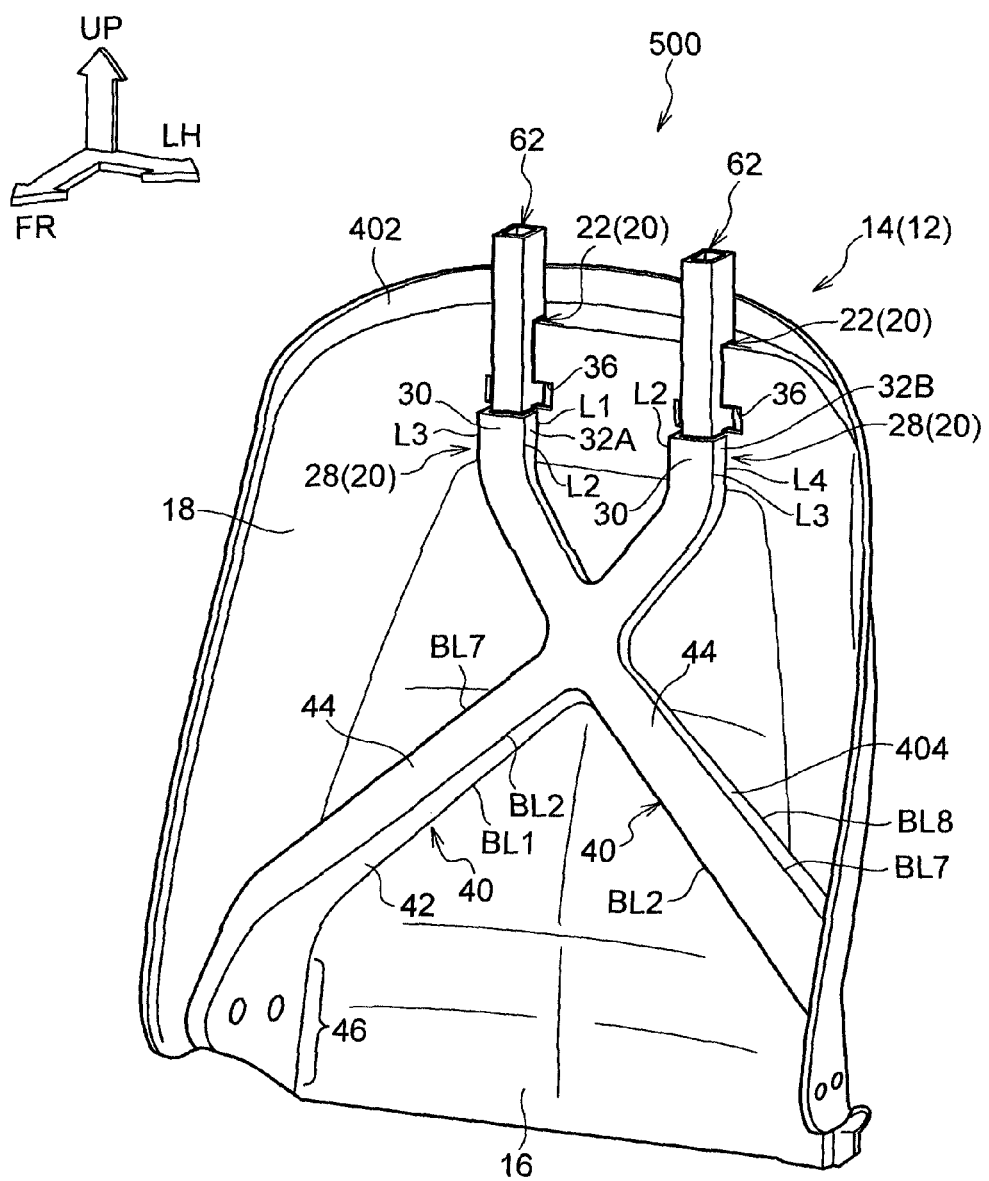
FIG. 10 is a perspective view showing the entire seat back frame used in a vehicle seat pertaining to a sixth embodiment as seen obliquely from the seat front and left side.

A vehicle seat 500 pertaining to a sixth embodiment will be described using FIG. 10. The sixth embodiment is configured in the same way as the fifth embodiment except for the points described below.

In the sixth embodiment, the pair of vertical wall beads 40 are joined together at their lengthwise direction intermediate portions and intersect to form a substantially X-shape as seen from the seat front side. Additionally, the upper end portion of the vertical wall bead 40 disposed on the seat right side is joined to the lower fixing portion 28 disposed on the seat left side, and the upper end portion of the vertical wall bead 40 disposed on the seat left side is joined to the lower fixing portion 28 disposed on the seat right side. Furthermore, the lower end portions of the vertical wall beads 40 are joined to the lower end portion of the peripheral frame portion 18, and the first wall portions 42 at the coupling portions 46 are bent in such a way that their thickness direction coincides with the seat width direction. Because of this, the sixth embodiment also achieves the same action and effects as the fifth embodiment.

Furthermore, in the sixth embodiment, the lower fixing portions 28 are coupled to the right and left coupling portions 46 via the vertical wall beads 40, so the load that has been input to the lower fixing portions 28 can be dispersed to the right and left coupling portions 46.

Moreover, in the sixth embodiment, the vertical wall beads 40 are formed in a substantially X-shape as seen in a front view, so the torsional stiffness of the seat back frame 14 can be raised.

Seventh Embodiment

Figure 11:
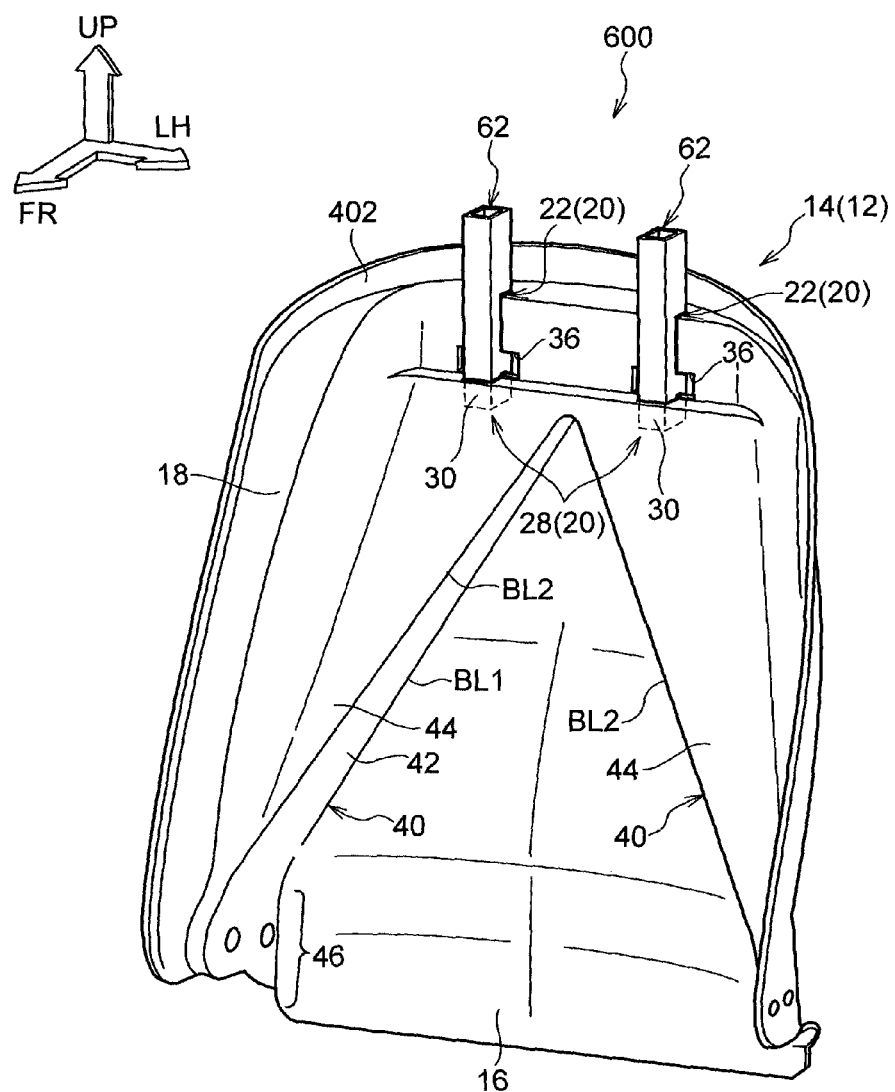
FIG. 11 is a perspective view showing the entire seat back frame used in a vehicle seat pertaining to a seventh embodiment as seen obliquely from the seat front and left side.

A vehicle seat 600 pertaining to a seventh embodiment will be described using FIG. 11. The seventh embodiment is configured in the same way as the sixth embodiment except for the points described below.

That is, in the seventh embodiment, the back panel portion 16 is formed in a substantially triangular shape as seen in a front view. Furthermore, the vertical wall beads 40 are each formed in a substantially triangular shape that becomes wider in width heading toward the seat upper side as seen in a front view, and the vertical wall beads 40 are joined to one another at their upper end portions. Additionally, in the vertical wall beads 40, the third wall portions 404 are omitted and the second wall portions 44 are joined to the peripheral frame portion 18. Moreover, the upper portions of the second wall portions 44 are joined to one another in the seat width direction and are joined to the lower front wall portions 30 of the lower fixing portions 28. Because of this, in the seventh embodiment also, the load that is input from the headrest 60 to the bracket fixing portions 20 at the time of a rear impact of the vehicle is directly transmitted by the vertical wall beads 40 to the coupling portions 46, so the seventh embodiment achieves the same action and effects as the sixth embodiment.

In the first embodiment to the seventh embodiment, the thickness of the vertical wall beads 40 is set to substantially the same thickness as the thickness of the back panel portion 16 and the peripheral frame portion 18 of the seat back frame 14. Instead of this, the thickness of the back panel portion 16 of the seat back frame 14 may also be set thinner than the thickness of the vertical wall beads 40. Because of this, the impact load F that has been input to the bracket fixing portions 20 can be transmitted to the coupling portions 46 while making the seat back frame 14 lighter in weight.

Furthermore, in the first embodiment to the seventh embodiment, the vertical wall beads 40 are formed integrally with the seat back frame 14. Instead of this, the vertical wall beads 40 may also be configured separately from the seat back frame 14 and integrally disposed on the seat back frame 14, and the bracket fixing portions 20 and the coupling portions 46 may be coupled together by the vertical wall portions 40.

Moreover, in the first embodiment to the seventh embodiment, the hole portions 36 are formed between the upper fixing portions 22 and the lower fixing portions 28 of the seat back frame 14, but the hole portions 36 may also be omitted. That is, the upper side wall portions 26A and 26B and the lower side wall portions 32A and 32B that respectively form pairs in the seat up and down direction may also be joined together in the seat up and down direction. The load that has been input to the upper fixing portions 22 can be transmitted via the upper side wall portion 26A and the lower side wall portion 32A as well as via the upper side wall portion 26B and the lower side wall portion 32B to the lower fixing portions 28.

Furthermore, in the first embodiment to the seventh embodiment, the first wall portions 42 at the coupling portions 46 are disposed in such a way that their thickness direction coincides with the seat width direction. That is, the first wall portions 42 at the coupling portions 46 extend in the seat up and down direction as seen from the seat front side. Instead of this, as seen from the seat front side, the first wall portions 42 at the coupling portions 46 may also be sloped in such a way as to follow the direction in which the vertical wall beads 40 extend. Because of this, the efficiency with which the load is transmitted by the vertical wall beads 40 to the coupling portions 46 can be further improved.

Moreover, in the first embodiment to the seventh embodiment, the insertion holes in the first wall portions 42 through which the bolts 76 are inserted are disposed adjacent to one another in the seat front and rear direction. Instead of this, the insertion holes may also be disposed adjacent to one another in the seat up and down direction.

The disclosure of Japanese Patent Application No. 2013-177251 filed on Aug. 28, 2013 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A vehicle seat comprising:
a seat cushion frame that configures a seat cushion on which a passenger sits;
a seat back frame that configures a seat back that is adapted to support a back of a seated passenger, the seat back frame being formed in a panel shape and having, on a lower portion thereof on both sides in a seat width direction, coupling portions that are coupled to the seat cushion frame;
fixing portions that are formed in an upper portion of the seat back frame and that fix a headrest via stays that project from the headrest toward a seat lower side; and
load transmitting portions that are joined to lower end portions of the fixing portions, that are disposed in the seat back frame, that are each formed in a substantially L-shape opening toward the seat rear side and outward in the seat width direction or a substantially U-shape opening toward a seat rear side as seen in a plan sectional view at an intermediate position in an up and down direction of the seat back frame, and couple together the fixing portions and the coupling portions, wherein each of the load transmitting portions includes a first wall portion, in which a thickness direction of the first wall portion coincides substantially with the seat width direction, and a second wall portion, in which a thickness direction of the second wall portion coincides substantially with a seat front and rear direction, and
wherein each of the load transmitting portions is a bead in which a first ridgeline is formed at a boundary between the first wall portion and the second wall portion, the first ridgeline continuously interconnects each fixing portion and each coupling portion, and the first ridgeline is directly connected to each fixing portion and each coupling portion.

2. The vehicle seat according to claim 1, wherein the seat back frame includes a back panel portion that configures a central portion of the seat back frame, and the first wall portions project from the back panel portion toward a seat front side.

3. The vehicle seat according to claim 1 wherein the seat back frame includes a peripheral frame portion that configures an outer peripheral portion of the seat back frame, and the second wall portions project from the peripheral frame portion toward a seat width direction central side.

4. The vehicle seat according claim 1, wherein the second wall portions are joined to front end portions of the first wall portions.

5. The vehicle seat according to claim 1, wherein the load transmitting portions are formed integrally with the seat back frame.

6. The vehicle seat according to claim 2, wherein a thickness dimension of the back panel portion that configures the central portion of the seat back frame is set thinner than the thickness dimension of the load transmitting portions.

7. The vehicle seat according to claim 1, wherein, as seen from the seat front side, the load transmitting portions are curved in such a way as to become convex outward in the seat width direction starting at the fixing portions and the coupling portions.

8. The vehicle seat according to claim 1, wherein, as seen from the seat front side, the load transmitting portions slope straightly outward in the seat width direction heading toward the seat lower side.

9. The vehicle seat according to claim 1, wherein:
the fixing portions that fix the headrest are disposed as a pair, and
the pair of fixing portions are coupled together in the seat width direction by a coupling wall portion.

10. The vehicle seat according to claim 2, wherein:
the first wall portion and the second wall portion branch from the coupling portion and extend toward a seat upper side in each of the load transmitting portions, and
the seat back frame further comprises a peripheral frame portion that is disposed between the first wall portions and the second wall portions, a flange portion that is disposed on an outer peripheral portion of the seat back frame and is joined to outer peripheral portions of the second wall portions, ridgelines at boundaries between the first wall portions and the peripheral frame portion, ridgelines at boundaries between the peripheral frame portion and the second wall portions, and ridgelines at boundaries between the second wall portions and the flange portion.

11. The vehicle seat according to claim 1, wherein the load transmitting portions extend in substantially the same sectional shape from lower ends of the fixing portions to the coupling portions as seen in a plan sectional view.

12. The vehicle seat according to claim 1, wherein the load transmitting portions are joined to one another at lengthwise direction intermediate portions.

13. The vehicle seat according to claim 1, wherein the load transmitting portions are joined to one another at lengthwise direction upper end portions.

14. The vehicle seat according to claim 1, wherein:
the bead includes a second ridgeline formed at a boundary between the seat back frame and the first wall portion, and a third ridgeline formed at a boundary between the seat back frame and the second wall portion, and
each of the second and third ridgelines is directly connected to each fixing portion and each coupling portion.

* * * * *